July 23, 1968 W. F. WALTER 3,393,413
CLEANER FOR MEAT PRODUCTS
Filed May 26, 1966 2 Sheets-Sheet 1
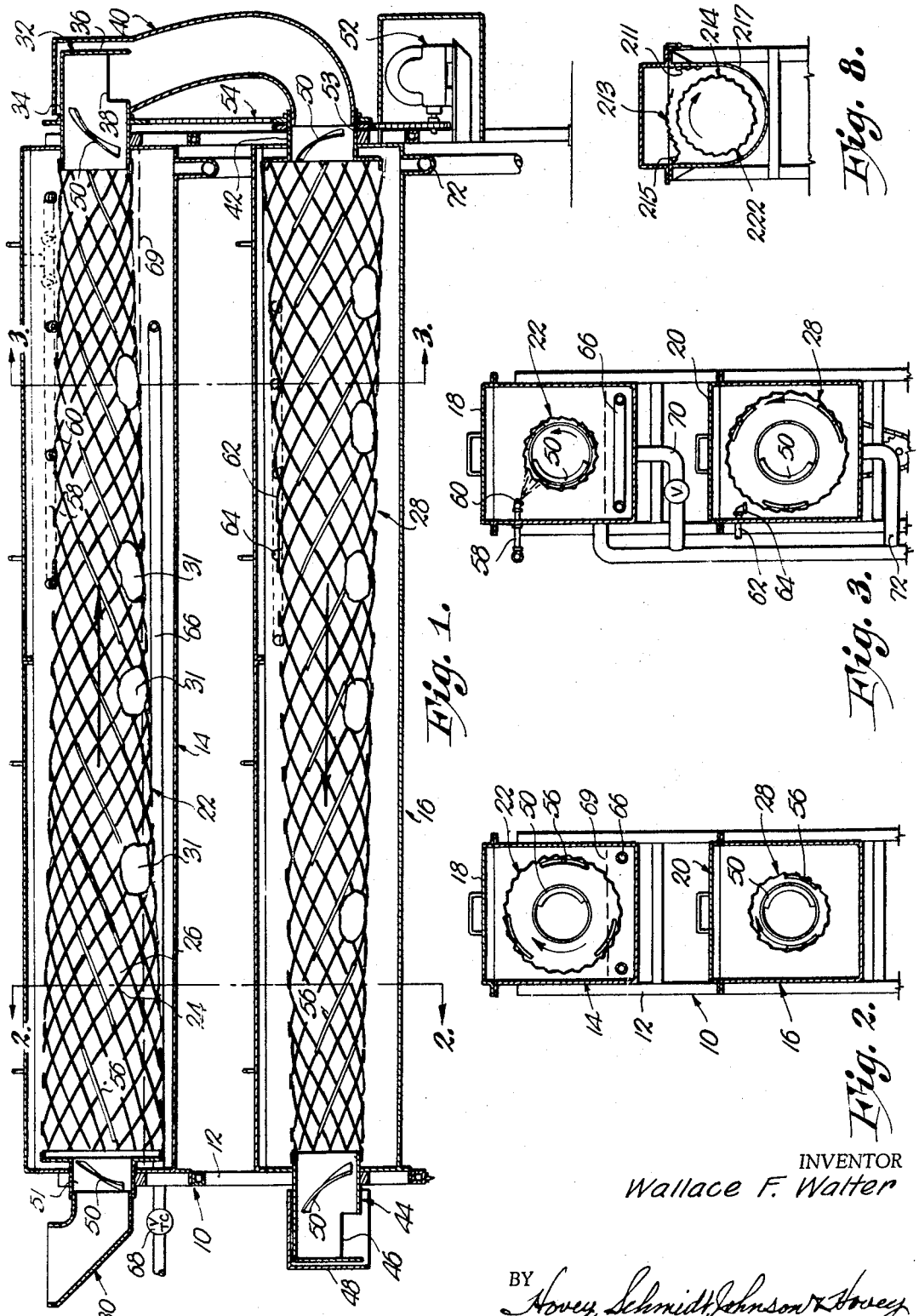
INVENTOR
Wallace F. Walter

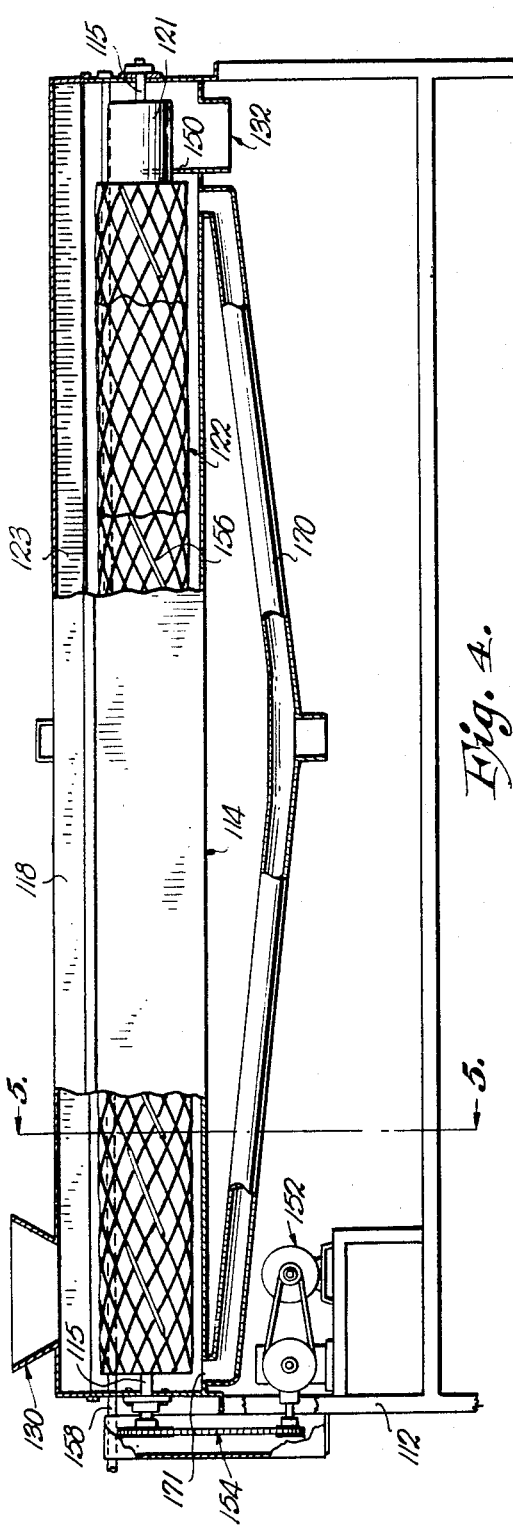
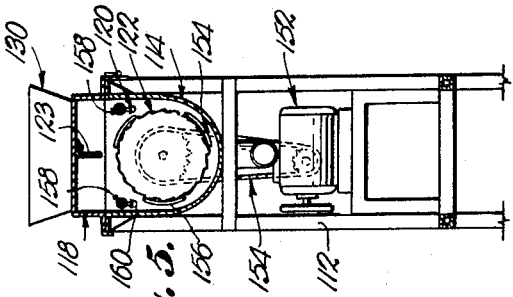

`United States Patent Office`

3,393,413
Patented July 23, 1968

3,393,413
CLEANER FOR MEAT PRODUCTS
Wallace F. Walter, Omaha, Nebr., assignor to Land & Cattle, Inc., Troy, Ohio, a corporation of Ohio
Filed May 26, 1966, Ser. No. 553,197
10 Claims. (Cl. 15—3.13)

ABSTRACT OF THE DISCLOSURE

A cleaner for meat products including an elongated, foraminous tube mounted for rotation within a tank and provided with vane means rotatable with the tube for advancing the product from one end of the tube to the other. The disclosure includes tubes tapered in the direction of the outlet, cylindrical tubes, and elongated rubbing members mounted on the tank in disposition for movement of the animal products between the tubes and the rubbing members. Fluid circulating conduits are provided proximal the tubes to facilitate treatment of the products.

---

This invention relates to a cleaner for meat products and, more particularly, to apparatus for cleaning and blanching, as well as cooling animal viscera or parts which may include pork or beef hearts, stomachs, tongues or the like.

Heretofore blanching, washing and chilling of these products has, in the main, been performed in a batch-type device wherein the products were manually placed in a vat, blanched and rinsed, and then manually removed from the vat. Even though rotatable vats have heretofore been used, transfer of the animal products from one operation to the other has generally been an operation performed manually. Further, the blanching, desliming and cooling of animal stomachs and tongues, as well as washing of dried and coagulated blood and separation of extraneous matter such as veins or the like from the hearts, has been incomplete and not uniform when carried out in a batch-type process. It has been apparent also, that uniform chilling and freezing of the animal products cannot be accomplished when the products are bunched together in a batch.

Accordingly, the primary object of this invention is to provide apparatus for carrying out the blanching, desliming, cleaning and cooling of animal parts in a continuous operation where each viscus or part receives substantially uniform treatment.

Another important object of this invention is to provide such apparatus capable of accomplishing the foregoing object without imparting deleterious tearing of the products as they are cleaned.

Other important objects of this invention will be pointed out or will become apparent from the following specification and appended claims.

In the drawings:
FIGURE 1 is a vertical, cross-sectional view through one form of apparatus embodying the principles of this invention, parts appearing in elevation for clarity;
FIG. 2 is a vertical, cross-sectional view taken along line 2—2 of FIG. 1;
FIG. 3 is a vertical, cross-sectional view taken along line 3—3 of FIG. 1;
FIG. 4 is a side elevational view of a modified form of apparatus embodying the principles of this invention, parts being broken away and appearing in cross section to reveal details of construction;
FIG. 5 is a vertical, cross-sectional view taken along line 5—5 of FIG. 4;
FIG. 6 is an enlarged, fragmentary vertical, cross-sectional view showing the tubular member and associated barrier of the apparatus of FIG. 4, with a pork heart illustrated therebetween;
FIG. 7 is a view taken along line 7—7 of FIG. 6; and
FIG. 8 is a fragmentary, vertical, cross-sectional view similar to FIG. 5 but illustrating a still further modified form of the machine embodying the principles of this invention.

Referring initially to FIG. 1, apparatus embodying the principles of this invention comprises a machine 10, including a frame 12 supporting an upper, elongated, generally rectangular tank 14, and a similar lower tank 16. Removable covers 18 and 20 are provided for tanks 14 and 16 respectively.

An elongated, tubular, transversely circular, foraminous member 22 is mounted for rotation on frame 12 and in tank 14. Member 22 is formed from expanded metal which may be of stainless steel, but otherwise is of a type quite well known and readily available commercially. Thus, member 22 comprises a plurality of interconnected ribs 24 disposed with respect to one another in a manner to present relatively diamond-shaped openings 26 between a pair of adjacent, longitudinally extending, interconnected ribs 24. The expanded metal forming member 22 is bent in the shape of a tube and it will be noted that the diameter of member 22 decreases as the right end of member 22 as viewed in FIG. 1, is approached.

A second member 28 is mounted for rotation in tank 16, and member 28 is identical in all respects with member 22. However, member 28 is mounted on frame 12 with the smallest end located at the left when viewed in FIG. 1.

An inlet 30 is mounted on frame 10 adjacent the large end of member 22 and provides means for directing animal parts 31, such as stomachs, tongues or the like, and referred to herein broadly as viscera, to the interior surface of member 22. An outlet 32 comprising a cylindrical tube 34 is integrally secured in concentric relationship with the small end of member 22 and extends outwardly therefrom. Tube 34 is closed at its outer end by a wall 36, and an opening 38 in the sidewall of tube 34 permits discharge of the viscera into an elongated, curved conduit 40 which terminates in juxtaposed relationship with a short inlet 42 adjacent the large end of member 28.

An outlet 44 similar to outlet 32 is secured to the small end of member 28 and is provided with an opening 46 for discharging the viscera from machine 10 into a housing 48 for directing the viscera to whatever receiving apparatus or receptacle may be desired. Relatively short, transversely bent conveyor flights 50, disposed at both the inlet and outlet ends of members 22 and 28 in angularly disposed relationship, have longitudinally arcuate surfaces disposed to engage the viscera and move them from the inlets into the rotating members 22 and 28 and from the outlets of the rotating members to the receiving conduits. Thus, flights 50 are mounted for rotation on the interior surface of short, tubular extensions 51 and 53 integral with members 32 and 28 respectively, and in outlet tubes 34 and 44.

A prime mover 52 is operably coupled with members 22 and 28 through drive means 54 for imparting rotation to the respective members 22 and 28 and in suitable directions for cooperating with a series of elongated, curved, parallel traverse bars or vanes 56 rigidly secured to the inner surfaces of members 22 and 28 respectively, and disposed at an angle with respect to the longitudinal axes of the members in a direction to impart pushing of the viscera from the large end to the small end of each member respectively as the members are rotated. It will be noted that the series of vanes 56 are disposed longitudinally along the members, and it will be understood that a plurality of series of such vanes may be provided for each member if desired. Further, although it has been determined that enhanced results may be achieved when pork or beef stomachs or tongues are being processed by machine 10 by the use of intermittent vanes, it will be understood by those skilled in the art that one continuous, helically extending vane, mounted on the interior surface of each rotating member, could be utilized for this purpose.

A longitudinally extending conduit 58, having a plurality of spray nozzles 60, is mounted in tank 14 adjacent a portion of member 22, and a similar conduit 62 having nozzles or orifices 64, is disposed adjacent a portion of member 28. A second fluid line 66 is located generally below member 22 within tank 14 and has a valve 68, which may be temperature controlled, interposed therein for controlling the flow of pressurized fluid for discharge within tank 14 adjacent member 22. Suitable discharge nozzles (not shown) may be provided in line 66 as will be understood by those skilled in the art. Drainage pipes 70 and 72 are provided for conducting fluids from tanks 14 and 16 respectively.

Referring now to FIGS. 4–7, a modified form of apparatus embodying the principles of this invention includes a frame 112 mounting a longitudinally extending, transversely U-shaped tank 114 having a hinged cover 118. A longitudinally extending, tubular, transversely circular and cylindrical member 122 is mounted for rotation in tank 114 such as by stub shafts 115, one of which is operably coupled with a prime mover 152 by drive means 154 to rotate member 122 in tank 114. The arcuate sidewall of tank 114 extends in relatively closely spaced proximity with member 122 throughout a substantial portion of the periphery of the latter.

Member 122 is constructed from the same expanded metal material as are members 22 and 28, such material being shown more clearly in FIGS. 6 and 7 wherein it may be seen that the material includes a plurality of generally longitudinally extending ribs 124 interconnected to present therebetween a plurality of openings 126. The expanded metal is bent in arcuate configuration to present a tube and it will be noted in FIG. 6 that the ribs 124 are disposed at an angle with respect to the general plane of the tube formed by the interconnected network of ribs 124, whereby relatively sharp, outwardly extending corners 125 and 127 of each rib define outer and inner surfaces respectively of member 122. The term "outwardly extending" as used herein with reference to the corners of ribs 124 means extending outwardly from the plane of the tube defined by the plurality of ribs either toward or away from the axis of the member. Thus, the outer and inner surfaces of member 122 comprise a network of relatively sharp corner edges 125 and 127. It will be understood that the same is true of the tubes which form members 22 and 28 of machine 10.

A series comprised of a plurality of intermittent, curved, parallel extending, elongated vanes 156 are rigidly secured as by welding or the like to the outer surface of member 122 and the vanes are inclined at an angle with respect to the longitudinal axis of the latter to serve as impeller means for moving articles resting on the outer surface of member 122, longitudinally from one end of the latter to the other end thereof. Manifestly, a single, continuous helically wound vane 156 rigidly secured to the outer surface of member 122 could be utilized for this purpose if desired.

An inlet 130 adjacent one end of member 122 in cover 118 in overlying relationship to member 122 serves as means for directing animal viscera such as pork hearts onto the outer surface of member 122. The vertically extending, relatively smooth sidewall 117 of tank 114 on the side of member 122 in the direction of rotation of the latter, serves as a guide to direct the viscera down into tank 114 between the outer surface of member 122 and the inner, smooth, arcuate surface of tank 114 as member 122 is rotated and as is illustrated in FIG. 6 wherein a pork heart 119 is shown between member 122 and wall 117. A longitudinally extending, vertically disposed flap 123 is secured to top 118 and overlies the axis of member 122 throughout a portion of the length of the latter.

The end of member 122 remote from inlet 130 is rigidly secured to a cylindrical, smooth member 121 disposed in concentric relationship with member 122 and proximal an outlet 132 in tank 114. An upwardly extending baffle 150 adjacent outlet 132 serves to hold liquid within tank 114 and to prevent it from gravitating through outlet 132. Thus, such liquid and extraneous matter is caused to gravitate through a discharge pipe 170. An opening 171 proximal the end of member 122 adjacent inlet 130 also communicates with discharge pipe 170 for permitting complete removal of extraneous matter from tank 114.

Referring now to FIG. 8, a modified form of machine particularly useful for removing the slime from viscera such as animal stomachs is fragmentarily illustrated. This machine is identical to the machine illustrated in FIGS. 4–7 but includes the following additions. A rubbing member 211 comprising a rectangular, flat sheet of expanded metal is secured to the inner, upright wall 217 of tank 214 on the side of member 222 in the direction of rotation thereof. Member 211 extends downwardly into tank 214 a substantial distance which may be about one-fourth to one-half the depth of tank 214 and extends substantially the length of the latter adjacent member 222.

A swingable rubbing cover member 213 comprising an elongated, transversely arcuate sheet of expanded metal is hingedly mounted inside tank 214 by hinge means 215 proximal the upper level of member 222 and on the side of tank 214 remote from rubbing member 211. Cover member 213 extends substantially the length of rotatable member 222 and the end of cover member 213 is free to permit the latter to swing downwardly by gravity toward member 222. Thus, cover member 213 serves to hold viscera against member 222 for more complete rubbing between the members 213 and 222.

It has been found that desirable results are achieved if the expanded metal from which members 211 and 213 are formed is of finer mesh than that used for the rotatable members 22, 28, 122 and 222, heretofore described.

In operation, referring initially to the form of the invention illustrated in FIGS. 1–3, viscera such as pork or beef stomachs or tongues are directed through inlet 30 to the interior of member 22 which is rotated by prime mover 52. Stomachs are generally split before entering the machine. Rotation of member 22 causes a tumbling of the viscera as they are engaged by the ribs 24, and the relatively sharp edges thereof are sufficient to cause thorough contact with the outer surfaces of the viscera or parts as they are moved through member 22 by the angularly disposed vanes 56. Nevertheless, the viscera are free to agitate and tumble as they proceed along the longitudinal path, thus preventing any unnecessary tearing of the tissues.

Contact by the vanes 56 extending outwardly from the plane of tubular member 22 against the viscera not only moves the viscera sequentially and continuously toward outlet 32, but also thoroughly agitates the viscera by physical impact therewith to insure good cleaning and contact with liquid which may be contained within tank 14 to a level generally as illustrated by the dashed line 69. The relatively large diameter of the end of member 22 adjacent inlet 30 permits the viscera to be completely immersed in the liquid for blanching while the tapered construction provides for the gentle lifting throughout the continuous movement of the viscera from this liquid where they may be drained as they approach outlet 32. Manifestly, the liquid within tank 14 can be provided to a level and of a nature to accomplish the results desired. It is contemplated that steam for heating the liquid might be introduced through line 66 if desired. Conduit 58 and nozzles 60 permit washing of the viscera as they are lifted from the liquid in the bottom of tank 14 and agitation of the viscera as they proceed along below nozzles 60 insures that they will be thoroughly washed and cleaned at this location.

The entire first tank 14 may be used for blanching and washing purposes, the stomachs, tongues or other viscera emerging from outlet 32 and proceeding into tank 16 can then be subjected to a thorough washing followed by lifting of the parts from the level of liquids which gravitate to the bottom of tank 16. Manifestly, scrubbing of the parts takes place during the time the parts are in both members 22 and 28. The animal parts can then be subjected to the application of cryogenic liquids, solids or gases to effect cooling of the parts to whatever extent is desired. It will, of course, be understood that both tanks 14 and 16 with their associated members 22 and 28, may be utilized for cleaning and blanching purposes, the cooling and refrigeration of the viscera to be performed after the latter emanate from outlet 44. The tapered construction of members 22 and 28 not only serve to gently lift the viscera from the liquids in the bottoms of the respective tanks 14 and 16, but also tend to concentrate the parts for handling purposes and thorough agitation by contact of the parts, one with another. Additionally, the viscera are progressively moved toward cleaner liquid which is found in the upper strata of liquid since the extraneous matter washed from the viscera tends to concentrate because of its weight near the bottom of the tank.

Referring now to the apparatus illustrated in FIGS. 4–7, the novel foraminous, tubular member constructed from expanded metal as described herein, is particularly suited for the cleaning of animal viscera such as pork or beef hearts and for cleaning and removing the slime or mucus from animal stomachs. The parts, also referred to generally herein as viscera, gravitate through inlet 130 to the outer surface of the rotating member 122 where they are retained upon such surface by the fact that the member rotates in relatively close juxtaposed relationship to the upright wall member 117. The latter present a relatively smooth surface which directs the hearts or other parts to slide between the inner surface of tank 114 and member 122 as they are engaged by the vanes 156 during rotation of member 122. The sharp edges 125 of ribs 124 thoroughly scrape the outer surface of animal parts such as hearts 119 and the rotation of member 122 squeezes the parts through a path of travel around the inner surface of tank 114 and around to the upper surface of member 122. Vanes 156 contact the parts for again squeezing them between tank 114 and member 122 and moving them along the latter. This process continues repeatedly throughout the longitudinal path of travel of the parts along member 122.

Contact of the vanes 156 with viscera 119 and squeezing between the tank and rotating member further tends to squeeze and palpitate the hearts for squeezing the blood and dried blood from the interior chamber structure of the hearts. To this end, longitudinally extending fluid supply lines 158, along member 122 within tank 114, are provided with spray nozzles 160 to insure a plentiful supply of washing liquid as may be desired.

Flap 123 serves to prevent the viscera from tumbling too violently as member 122 is rotated. Further, the flexible nature of flap 123 absorbs some of the momentum of the viscera as they are spun from between the tank and the rotating member. Thus, flap 123 cushions the impact of the viscera thrown by the member 122.

The scrubbing action of the ribs 124 against the outer surfaces of the viscera 119, especially such as animal hearts, continues throughout the entire length of member 122 to thoroughly remove the veins and extraneous tissue from the hearts. Hearts to be treated by this machine may be sliced if desired. The matter so cleaned from the hearts and other viscera gravitates with the washing liquid through pipe 170 to a discharge. The cleaned viscera are deposited on the relatively smooth outer surface of member 121 where they gravitate through outlet 132 to any suitable collecting medium. Baffle 150, of course, serves as a separator to prevent egress of liquid and extraneous matter entrained therein with the viscera as the latter flow through outlet 132.

It will be understood that conduits 158 may be of any desired length as is deemed necessary for washing the hearts, and may also be utilized for the conduct of cryogenic materials into proximal relationship with the viscera for cooling or refrigerating the latter.

The perforations provided by the foraminous construction of memers 22 and 28, as well as member 122, are ideally suited to bring sterilizing, washing and cooling fluids into contact with the entire surfaces of the animal viscera and to permit such fluids to permeate the respective tanks. Such construction also is advantageous in effecting thorough draining of such liquids and materials washed from the viscera to the bottom of the tank for further movement away from the animal viscera as the operation proceeds continuously and without interruption.

Referring now to the embodiment of the invention illustrated in FIG. 8, operation of this form of the invention is identical to that described with respect to the machine illustrated in FIGS. 4–7. However, this machine is particularly suited for removing slime from animal stomachs and hearts. The rough surface presented by member 211 and by the hinged member 213 insures thorough contact of the viscera with roughened surfaces on both sides and throughout a major portion of the path of travel of the viscera through the machine. At the same time, the desirable squeezing action is maintained. The hinged member 213 serves to provide gentle pressure to keep the viscera in contact between the member 213 and the rotating member 222.

It will be apparent to those skilled in the art, that animal viscera can, if desired, be passed sequentially through two, or even all three machines of this invention if desired. Also, the machines can be provided with suitable connecting conduits of conveyor means (not shown) connecting the outlet of one machine with the inlet of another machine for this purpose.

Having thus described the invention, what is claimed as new and desired to be secured by Letters Patent is:

1. Apparatus for cleaning animal viscera comprising: an elongated, foraminous cleaning member including a plurality of spaced, outwardly extending edges presenting a scrubbing surface on said member, said member being formed of expanded metal to present a network of interconnected, transversely rectangular ribs forming said surface, the member being tubular and of transversely circular cross-sectional configuration, said ribs being disposed at an angle with respect to the plane of said tube to present relatively sharp edges at the surface of said tube;
means mounting said member for rotation about the longitudinal axis thereof;
means for directing said viscera onto said surface; and
impeller means carried by the member and disposed to engage the viscera while the latter is on the scrubbing surface during rotation of the member to move the viscera along the surface longtiudinally of the member and to tumble the viscera for contact by said edges with substantially the entire outer surface of the viscera, said impeller means including vane means secured to the member and projecting outwardly from said surface, said vane means being inclined at an angle with respect to the longitudinal axis of the member for engaging the viscera on the surface to push the latter longitudinally along the member as the latter is rotated.

2. Apparatus as set forth in claim 2, wherein said vane means includes a series of intermittent bars rigidly secured to said surface, said series extending longitudinally of the member.

3. Apparatus as set forth in claim 1, wherein is included a supply of pressurized liquid, and conduit means extending adjacent said surface, said conduit means being provided with a plurality of discharge orifices to permit discharge of liquid onto said viscera for washing the latter as the viscera are moved along said surface by the vanes.

4. Apparatus as set forth in claim 1, said member having an inner surface and an outer surface, the vanes being disposed on the outer surface, and a relatively smooth, arcuate wall extending longitudinally of the member in relatively close proximity therewith, the wall being disposed for engagement by the viscera for squeezing the latter between the wall and the scrubbing surface of the member as the member is rotated.

5. Apparatus as set forth in claim 1, said member having an inner surface and an outer surface, the vanes being disposed on said inner surface, and wherein said directing means includes structure for directing the viscera inside the tubular member adjacent one end thereof for passage along said inner surface as the member is rotated.

6. Apparatus as set forth in claim 1, wherein said member is tapered with the cross-sectional area of the member decreasing as the end thereof remote from the directing means is approached.

7. Apparatus for cleaning animal viscera comprising:
a horizontally disposed, elongated, rigid, foraminous cleaning member formed of expanded metal, shaped into transversely circular, cross-sectional tubular configuration to present a network of interconnected, transversely rectangular ribs bent to present generally diamond-shaped openings between each adjacent pair of interconnected ribs, the ribs being disposed at an angle with respect to the arcuate plane of said tube to present outwardly directed corner edges of each rib at the outer surface of said member;
a frame;
means mounting said member on the frame for rotation about the longitudinal axis of the member;
inlet structure mounted on the frame adjacent one end of the member for directing said viscera onto said outer surface adjacent said one end of the member;
a plurality of mutually spaced, curved, upwardly extending, parallel vanes rigidly secured to said outer surface, said vanes being disposed in an intermittent series extending longitudinally along the member, each vane being disposed at an angle with respect to the longitudinal axis of the member to push viscera on said outer surface toward the opposite end of the member;
prime mover means operably coupled with the member for rotating the latter;
a longitudinally extending, transversely arcuate wall disposed in relatively close, partially embracing relationship around the member and disposed to squeeze the viscera between the wall and said outer surface of the member and to permit scrubbing action of said ribs as the member is rotated;
a catch basin mounted on said frame and extending beneath the member for receiving extraneous matter squeezed and scrubbed from the viscera by intermittent engagement of the vanes and ribs; and
discharge means adjacent the end of the member remote from said inlet end for receiving the scrubbed viscera and directing the latter away from the member.

8. Apparatus as set forth in claim 7, wherein is included an upright, stationary, rough member on said wall adjacent said rotatable member in facing relationship to the latter and on the side of the rotating member in the direction of rotation thereof.

9. Apparatus as set forth in claim 7, wherein is included an elongated, transversely arcuate member provided with a rough surface, said member being hingedly mounted to said wall for swinging movement about an axis extending generally parallel with the axis of rotation of the rotatable member toward and away from the latter.

10. Apparatus as set forth in claim 7, wherein is included fluid supply means adjacent said member for supplying pressurized fluid to the viscera while the latter are being scrubbed by said member.

References Cited
UNITED STATES PATENTS

| | | | |
|---|---|---|---|
| 790,909 | 5/1905 | McCann. | |
| 1,781,301 | 11/1930 | Randall | 51—164 X |
| 1,925,362 | 9/1933 | Anstiss. | |
| 2,119,311 | 5/1938 | Biedermann | 51—164 X |
| 2,210,584 | 8/1940 | Hilemann et al. | 51—164 |
| 2,461,366 | 2/1949 | Bletso et al. | 51—164 X |

EDWARD L. ROBERTS, *Primary Examiner.*